W. J. MIELKE.
TRACTION WHEEL.
APPLICATION FILED AUG. 28, 1915.

1,180,865. Patented Apr. 25, 1916.

Inventor
W. J. MIELKE
By Watson E. Coleman
Attorney

UNITED STATES PATENT OFFICE.

WILLIAM J. MIELKE, OF HARTFORD, SOUTH DAKOTA, ASSIGNOR TO FARM HORSE TRACTION WORKS, OF HARTFORD, SOUTH DAKOTA, A CORPORATION OF SOUTH DAKOTA.

TRACTION-WHEEL.

1,180,865.      Specification of Letters Patent.      Patented Apr. 25, 1916.

Application filed August 28, 1915. Serial No. 47,833.

*To all whom it may concern:*

Be it known that I, WILLIAM J. MIELKE, a citizen of the United States, residing at Hartford, in the county of Minnehaha and State of South Dakota, have invented certain new and useful Improvements in Traction-Wheels, of which the following is a specification, reference being had to the accompanying drawings.

My invention relates to the construction of wheels, and particularly to the construction of wheels for tractors.

The primary object of my invention is to improve upon the construction of tractor wheels, and particularly to provide a relatively light wheel but which shall be very rigid in action and which will be thoroughly braced.

A further object of my invention is to so construct the wheel that it may be very cheaply made both as regards economy of time in assembling the wheel and economy of material.

A further object of the invention is to improve upon the construction and application of the spokes to the wheel so that these spokes will act as braces and so that each spoke will be held by a plurality of rivets, the rivets holding one spoke in place also engaging and holding in place the next adjacent spoke.

A further object is to improve upon the construction of the rim of the wheel.

Other objects will appear in the course of the following description.

Figure 1:
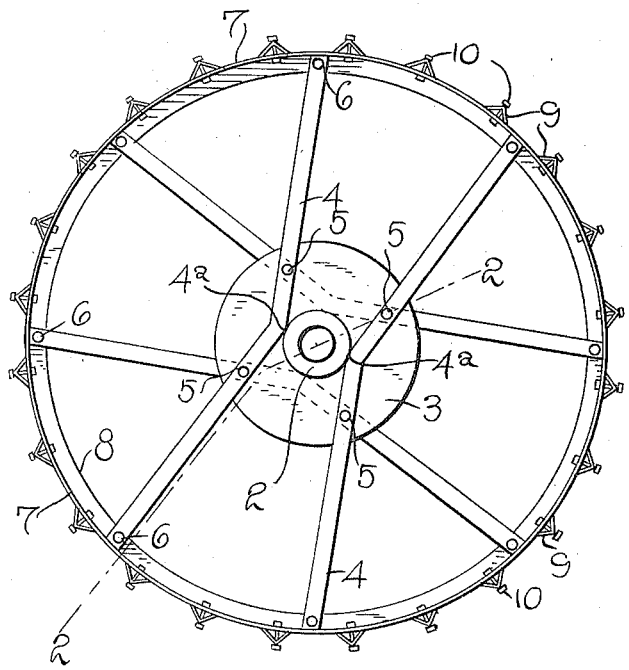
Figure 2:
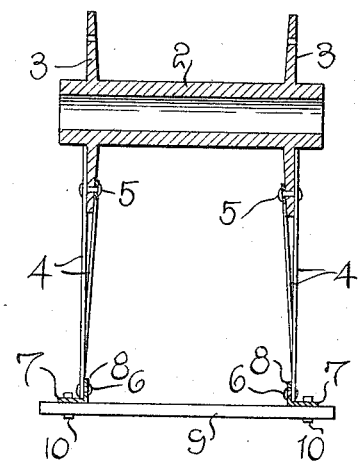

My invention is illustrated in the accompanying drawings, wherein:

Figure 1 is a side elevation of a traction wheel constructed in accordance with my invention; Fig. 2 is a section on the line 2—2 of Fig. 1.

Referring to these figures, 2 designates the hub of the wheel upon which is formed the outwardly or radially projecting annular flanges or webs 3. As illustrated, these webs are tapered in cross section from the hub toward the circumference of the web or flange, and these webs are set inward from the ends of the hub, as shown clearly in Fig. 2.

Extending across the face of each flange 3 are the spokes 4. These spokes are formed by metallic bars or rods which are angularly bent each at its middle as at 4ª, the apex of this bend in the spoke bearing against the hub as shown clearly in Fig. 1. Each spoke extends entirely across the corresponding flange 3 and is riveted thereto at a plurality of points as by the rivets 5, and at its ends each spoke is riveted as at 6 to a rim designated generally 7. This rim, as illustrated in Fig. 2, may be angular in cross section, the spokes being riveted to the inwardly extending flange 8 of the angle iron rim.

It will be seen from Figs. 1 and 2 that the spokes coacting with each flange are placed on opposite sides of the flange and that by reason of the fact that the flange is tapered in cross section from its base toward its circumference the spokes at their ends will be disposed in one plane so as to fit against and be riveted to the inwardly extending flange 8 of the rim. Half of the spokes are placed on one side of the corresponding flange 3 while the remainder of the spokes are placed on the opposite side of the flange and the spokes are placed so that they intersect each other so that one rivet 5 will pass through two adjacent or intersecting spokes and through the flange 3. Thus instead of having each spoke riveted by itself to the hub I provide that each rivet will pass through two of the spokes, thus economizing in rivets. I have shown only two rivets for each spoke, but it will be obvious that more rivets might be used if desired in order to secure strength. I find, however, that the construction illustrated in Fig. 1 is particularly strong by reason of the fact that two spokes as they may be termed, are formed in one piece extending across and bearing flat against the face of the flange, the two adjoining spokes bearing at their meeting ends against the hub. It will be seen that the strain on the spokes is supported not only by the rivets but by the fact that the spokes bear at the middle against the hub and that the spokes not only act as spokes but also as braces bracing the wheel at all points against deforming stresses.

While I do not wish to be limited to any particular manner of applying teeth or cross bars to the rim of the wheel, I preferably form these cross bars 9 V-shaped or angular in cross section. These cross bars are applied at intervals to the rim 7 and bolted thereto by bolts 10. It is to be understood that these cross bars do not extend quite parallel to the axis of the hub 2 but have a slight inclination to this axis. In other words, the cross bars do not extend at right angles to the plane of rotation of the wheel but at an obtuse angle thereto.

I have found in practice that a tractor drive wheel constructed in accordance with my invention is particularly cheap and for some purposes is very much better than the ordinary tractor drive wheel, especially where the driver is keyed to the axle or driven by the hub instead of adjacent to the rim. Each spoke is a brace and the wheel, therefore, requires no bracing beyond the spokes themselves. This style of wheel can be made either as a single flange wheel or as a double flange wheel and instead of using eight spokes, that is, four bars as illustrated in Fig. 1, twelve spokes or more can be used by bending the bars to a sharper angle. I have found that my tractor wheels are particularly adapted for soft or loose ground. The drivers do not clog and even in very wet soil, because of the open construction of the driver, the mud or soil will fall from beneath the transverse bars or teeth 9 and the drivers will not skid.

Having thus described my invention, what I claim is:

A traction wheel including a hub having laterally spaced and radially projecting flanges disposed inward of the ends of the hub, the outer face of each flange being at right angles to the axis of the hub, the inner face of the flange extending outward and laterally toward the outer face, bars disposed on opposite sides of each flange, each bar being angularly bent at its middle to provide conjoined integral spokes extending tangentially with relation to the hub, each bar at its bend bearing against the hub, the bend of one bar on one side of the flange being disposed between the bars on the opposite side of the flange, rivets passing through each bar on one side of the flange and through a bar on the opposite side of the flange, rim members mounted upon the extremities of the spokes, and transversely extending connecting members mounted on the rim members.

In testimony whereof I hereunto affix my signature in the presence of two witnesses.

WILLIAM J. MIELKE.

Witnesses:
R. L. ATKINSON,
J. W. SCOTT.

Copies of this patent may be obtained for five cents each, by addressing the "Commissioner of Patents, Washington, D. C."